United States Patent [19]

Mayer

[11] 4,428,466
[45] Jan. 31, 1984

[54] CONTROL CURRENT TRANSMITTER IN FORM OF CONTACTOR MEANS WHICH YIELDINGLY ENGAGE A CONTROL CURRENT TRACK FOR A CHASSIS IN TRANSPORT SYSTEMS

[75] Inventor: Werner Mayer, Seelbach, Fed. Rep. of Germany

[73] Assignees: Translift AG, Kriens-Luzern, Switzerland; Translift Gesellschaft fur Hebe- und Forderanlagen mbH, Fed. Rep. of Germany

[21] Appl. No.: 263,541

[22] Filed: May 14, 1981

[30] Foreign Application Priority Data

May 14, 1980 [DE] Fed. Rep. of Germany ....... 3018428

[51] Int. Cl.$^3$ ............................................... B60L 5/36
[52] U.S. Cl. ..................................... 191/58; 191/59.1; 191/60.3
[58] Field of Search ................... 191/57, 58, 60.3, 3, 191/6, 59, 59.1

[56] References Cited

U.S. PATENT DOCUMENTS

| | | | |
|---|---|---|---|
| 970,865 | 9/1910 | Weber | 191/58 |
| 1,443,873 | 1/1923 | Donham | 191/58 |
| 3,396,246 | 8/1968 | Roney | 191/58 |
| 3,736,389 | 5/1973 | Stroppel | 191/57 X |

FOREIGN PATENT DOCUMENTS 2320204  3/1977  France ............................... 191/58

*Primary Examiner*—Richard A. Schacher
*Attorney, Agent, or Firm*—Allison C. Collard; Thomas M. Galgano

[57] ABSTRACT

A control current transmitter is provided of the type having contactor means which yieldingly engage a control current track for a trolley in conveyor systems. The contactor means consists of two contact blocks or rollers positioned in the longitudinal or driving direction of the trolley, disposed one behind the other and spaced apart from each other in an insulated manner, each of which is provided with separate control current lines coupled thereto.

6 Claims, 3 Drawing Figures

CONTROL CURRENT TRANSMITTER IN FORM OF CONTACTOR MEANS WHICH YIELDINGLY ENGAGE A CONTROL CURRENT TRACK FOR A CHASSIS IN TRANSPORT SYSTEMS

The invention relates to a control current transmitter in the form of contactor means which yieldingly engage a control current track for a trolley chassis or carriage in transport or conveyor systems.

It is known to transmit the traction current on traction current bars which are mounted in an insulated manner by contactor means to the drive motor of the chassis in transport systems, for example, overhead track-trolley devices.

It is also known to provide so-called "control current tracks" on the drive tracks through which the drive orders or commands are transmitted by special contactor means, for example, by transmitting pulses onto the relay switches in the chassis.

In the hitherto known transport systems, a plurality of control current tracks were required each having separate contactor means, due to the partially independent control mechanisms.

Consequently, relatively many control current tracks are required which render the total installation relatively expensive. Furthermore, in many cases it was a question of space for placing the required number of control current tracks next to the drive current tracks within the range of the tracks for the transport system.

It is therefore an object of the subject invention to provide a control current transmitter of the above-mentioned type with which the number of the control current tracks and thereby the required expense for the control operation can be lowered considerably.

This object of the invention is obtained in that a control current transmitter is provided in the form of contactor means which yieldingly engage a control current track for a chassis in transport systems which is characterized in that the contactor consists of two contact blocks or rollers positioned in the longitudinal or driving direction disposed in one line at a distance spaced apart and insulated from each other and coupled with separate control current lines.

The control current transmitter in accordance with the invention has the substantial advantage that only one control current track or rail is required for several control functions which is interrupted at arbitrary places as desired, whereby, as seen in the driving direction, the first contact block when brushing onto the next following piece of the control current track may receive a given control order or command and the contact block which in the driving direction is mounted rearwardly of the first one may receive a different control order. Thereby, it is possible to combine a plurality of control functions with the two spaced-apart and insulated from each other contact blocks or rollers, with the control functions being effected in any given number by varying the lengths of the interrupted control current tracks.

In accordance with a specific embodiment of the invention the contact blocks or rollers are mounted on a rocker, separately by an insulating layer mounted therebetween, in slot of an elongated housing in a pivotable manner.

The invention will now be explained in more detail in an example of a preferred embodiment of the control current transmitter in conjunction with the drawing.

Figure 1:
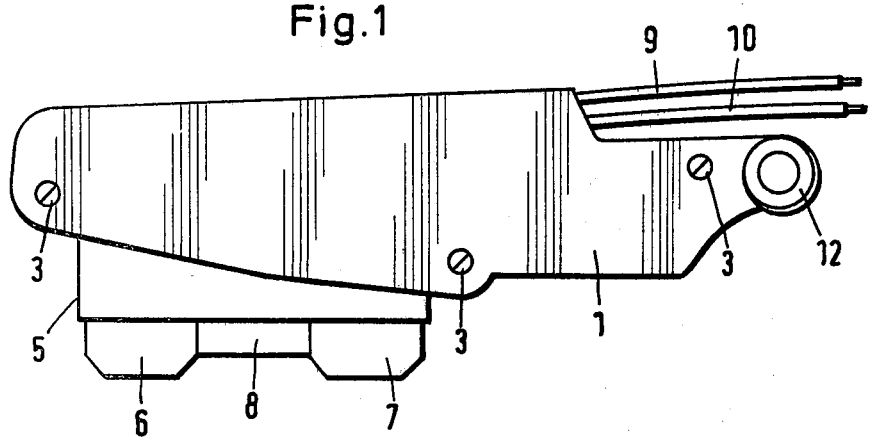
FIG. 1 is a side view of a control current transmitter in accordance with the invention.
Figure 2:
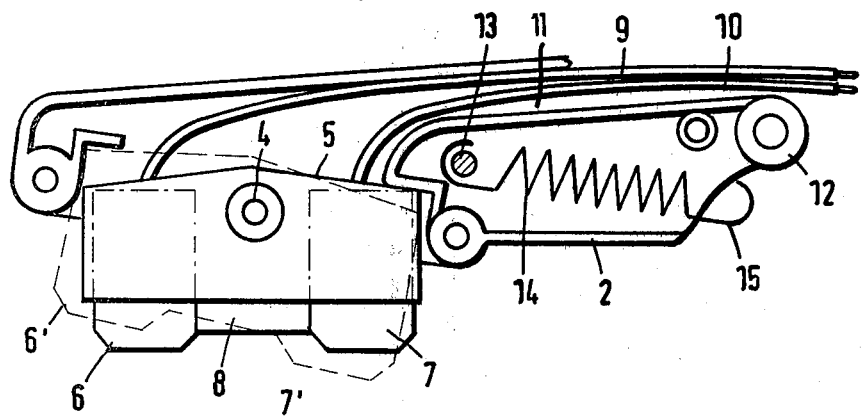
FIG. 2 is a side view comparable to that of FIG. 1, but with the housing shell removed.
Figure 3:
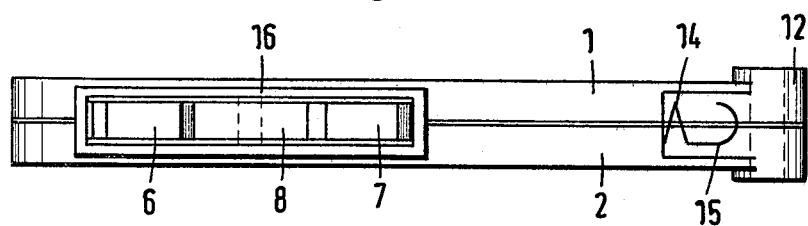
FIG. 3 is a plan view of the housing with the contact blocks.

As can be seen from FIGS. 1-3, the control current transmitter in accordance with the invention consists of an elongated housing composed of two half shells 1 and 2, connected with each other by screws or rivets 3.

Two contact blocks 6 and 7 are pivotably mounted on the inside of the housing on a rotating or pivot point 4 via a corresponding retaining means 5, in such a manner that, as can be seen from FIG. 2, they may be pivoted into the dash-dot line position 6', 7'.

The two contact blocks 6, 7 may consist of, e.g., graphite or carbon. It is also possible to provide contact rollers instead of the contact blocks.

The two contact blocks 6, 7 are separated from each other by an insulation layer 8 and are spaced at a defined given distance from each other.

The two contact blocks 6, 7 are each coupled with a control current line 9, 10.

The total arrangement of the contact blocks 6, 7 with holder 5 is in the form of a rocker, whereby the pivotable mounting permits a good engagement of the contact blocks onto a control current track (not shown).

The two control current lines 9, 10 are guided rearwardly to the outside by a conduit 11 formed in the inside of the housing.

The housing 1, 2 is pivotably mounted at its the rear end in chassis by means of a bored bushing 12. In order to permit a pushing of the contact blocks 6, 7 against the control current track which runs in a longitudinal direction, as does the transmitter which, as shown, runs from left to right, a helical spring 14 is mounted on the inside of the housing on a bolt 13, whereby the rear end 15 of the spring is mounted on a corresponding fixed point in the chassis or carriage. Thereby, the housing is pulled downwardly, so that the two contact blocks engage sufficiently on the control current track.

Due to the contact blocks which are mounted in the longitudinal or drive direction spaced at a distance from each other and in an offset disposition with each other, an arbitrary control pulse may be fed to the one contact block at the point of interruption of the control current track, while another control pulse is fed to the other contact block.

As can be seen from FIG. 3, the housing which consists of the two half shells 1, 2 is provided with a slot-like opening 16 from which the two contact blocks 6, 7 extend.

What is claimed is:

1. In a control current transmitter of the type having contactor means which yieldingly engage a segmented control current track for a trolley in a conveyor system, the improvement comprising
an elongated housing including two half shells joined together and defining an interior chamber therebetween, and
a single rocker pivotably and resiliently mounted in said chamber, and wherein said contactor means includes two contact members having separate control current lines pivotably mounted on said rocker and positioned one behind the other as viewed in the driving direction of the trolley, spaced apart from each other in an insulated manner, and adapted to make contact with said control current track, respectively, said rocker urging said contact members to move outwardly so that said contact members make good contact when operationally engaging said control current track.

2. The transmitter according to claim 1, wherein said contact members comprise contact blocks.

3. The transmitter according to claim 1, wherein said contact members comprise rollers.

4. The transmitter according to claim 1, wherein a bored bushing is provided on the rear end of said housing for effecting pivotable mounting thereof on the trolley.

5. The transmitter according to claim 1, additionally including a pin mounted in said housing and a helical spring, the front end of which is mounted on said pin and the rear end of which is mountable on a corresponding fixed point in the trolley.

6. The transmitter according to claim 1, wherein said housing has a rearwardly opening conduit, relative to the drive direction, provided for the control current lines which conduit communicates with said chamber.

* * * * *